United States Patent

[11] 3,620,597

| [72] | Inventors | Jacob Schwartz<br>Arlington;<br>Charles S. Naiman, Brookline, both of Mass. |
|---|---|---|
| [21] | Appl. No | 744,920 |
| [22] | Filed | July 15, 1968 |
| [45] | Patented | Nov. 16, 1971 |
| [73] | Assignee | Sanders Associates, Inc.<br>Nashua, N.H. |

[54] METHOD AND APPARATUS FOR NONLINEAR OPTICAL LIMITING
15 Claims, 9 Drawing Figs.

[52] U.S. Cl. ........................................... 350/160,
350/205, 351/44
[51] Int. Cl. ................................................ G02f 1/36,
G02b 9/00, G02c 7/10
[50] Field of Search ..................................... 250/226,
211, 350/160, 205; 321/69; 351/44

[56] References Cited
UNITED STATES PATENTS
| 3,495,893 | 2/1970 | Geusic et al. ............ | 350/160 |
| 3,245,315 | 4/1966 | Marks et al. ............ | 351/44 X |
| 3,258,597 | 6/1966 | Forrester ................ | 250/217 X |
| 3,267,807 | 8/1966 | Swope et al. ............ | 351/44 X |
| 3,448,405 | 6/1969 | Wolff ..................... | 350/160 X |

OTHER REFERENCES

Franken et al.: Optical Harmonics and Nonlinear Phenomena; Review of Modern Physics, Vol. 35; No. 1, Jan. 1963; pp. 23– 39 (QC-1-R45)

Miller et al. Optical Transmission Research; Proceedings at the IEEE; Vol. 54, No. 10; Oct. 1966; pp. 1300– 1311 (TK-5700-17)

*Primary Examiner*—Ronald L. Wibert
*Assistant Examiner*—V. P. McGraw
*Attorney*—Louis Etlinger ABSTRACT: Described herein is a method and apparatus for the nonlinear limiting of coherent radiant energy based upon the discovery of materials exhibiting nonlinear absorption. This discovery provides a method upon which the operation of apparatus for limiting, detecting and modulating coherent radiant energy is based.

INVENTORS
JACOB SCHWARTZ
CHARLES S. NAIMAN

BY

ATTORNEY

INVENTORS
JACOB SCHWARTZ
CHARLES S. NAIMAN

ATTORNEY

METHOD AND APPARATUS FOR NONLINEAR OPTICAL LIMITING

BACKGROUND OF THE INVENTION

The present invention relates to electro-optics and more particularly to a new and novel method and apparatus for the detection, limiting and modulation of coherent radiant energy.

DESCRIPTION OF THE PRIOR ART

In many applications of the laser it has become evident that the maximum intensity level of the laser output which may be used to advantage is considerably less than the actual output. In using the laser in industrial as well as military systems there is a hazard to both human vision and to electronic detectors which may be inadvertently exposed to laser radiation. Further the laser has been developed to a point that it has become feasible for use as a military weapon to damage or destroy optical surveillance, reconnaissance or observation devices used for military purposes whether electronic or human. Thus it has become desirable to provide some means of protecting such personnel and devices from the intense laser radiation without denying the observer a continuous view. The problem of eye damage has further made the military generally reluctant to use the laser where there is any possibility that friendly personnel may be exposed to the radiation.

A variety of measures have been taken to limit and/or control the intensity of laser radiation. These measures include linear absorbers, photochromic absorbers and what may be termed multistage second harmonic generation limiters.

Linear optical absorbers do of course reduce or attenuate the energy incident thereon by some fixed percentage, however, such absorbers do not absorb all energy exceeding some maximum level; i.e. as the input energy continues to increase so does the amount of output energy.

Photochromic absorbers may be broadly considered as nonlinear materials in that substantial energy attenuation occurs only when the input energy level is in excess of a predetermined value or absorbing threshold. Below the absorbing threshold the absorber acts basically as a linear absorber. As the input energy reaches the absorbing threshold the absorber material becomes increasingly opaque resulting in a sharp decline in the percentage of the input energy transmitted. Photochromic absorbers typically suffer from several limitations which are undesirable in an optical limiter. First the reaction time is relatively slow, typically on the order of microseconds. Pulsed lasers generally operate in the nanosecond region and thus may cause damage before the photochromic absorber can react. A second limitation arises in that these absorbers do not remain transparent to any radiation once the absorbing threshold is reached and thus preclude any observation from being made. Finally, the photochromic absorbers have a slow, on the order of microsecond, and incomplete recovery to their transparent state.

In the so-called multistage second harmonic generation optical limiter, advantage is taken of the physical property of selected materials where coherent laser energy at a fundamental frequency is converted in part to energy at the second harmonic frequency. Since both the fundamental and second harmonic energy are transmitted by such materials, as absorber of energy at the second harmonic is placed adjacent a conversion material. A limiter of this type will pass only some maximum value of energy at the fundamental frequency and once having reached this level will not increase in output regardless of an increase in input energy intensity. Unfortunately, however, this technique has several disadvantages. First, as in all second harmonic generation processes where it is sought to convert the greatest amount of the input energy to the second harmonic, the conversion material requires extremely precise orientation for phase matching; i.e. the speed of light in the material for both the fundamental and second harmonic frequencies must be the same for efficient second harmonic generation. Even a slight mismatch results in a drastic reduction in the amount of energy converted to the second harmonic. Secondly, the intrinsic nonlinear conversion coefficients of such limiters tend to be low since this characteristic is a linear function of the second harmonic absorption coefficient which in this case approaches zero and thirdly, the action of the second harmonic absorber takes place within a very short distance from the surface of the absorber thus local hot spots develop in the absorber which limit the capacity of the limiter to handle large thermal loads.

SUMMARY AND OBJECTS OF THE INVENTION

The present invention for the first time provides a solution to virtually all of the problems encountered in the prior art approaches to the problem of optical limiting while simultaneously providing improvements in the techniques for laser detection and modulation as inherent capabilities.

It is thus a primary object of the present invention to provide a new and novel process for the protection of electronic and human observation devices from damage resulting from high intensity coherent radiant energy.

It is another object of the present invention to provide a new and novel nonlinear optical limiter which will transmit only a given level of energy regardless of the input intensity.

It is still another object of the present invention to provide an optical limiter which requires no precise orientation.

It is a further object of the present invention to provide an optical limiter having a rapid response time.

It is an additional object of the present invention to provide an optical limiter having a high thermal capacity.

It is yet an additional object of the present invention to provide an optical limiter having the capacity to distinguish coherent from incoherent radiant energy.

It is still a further object of the present invention to provide a new and novel optical modulator.

These and other objects, features and advantages of the present invention are accomplished according to the present invention wherein a limiter material, to be more fully defined hereinafter, capable of acting as a nonlinear absorber of substantially all coherent radiant energy in excess of a predetermined intensity, is interposed between incoming radiation and the observation device to be protected and will become more apparent from the detailed discussion considered in conjunction with the accompanying drawings. The scope of the invention will be indicated in the claims.

Briefly stated the present invention is based upon the discovery by the Applicants that selected nonlinear optical materials partially absorb input energy at a fundamental frequency into energy states other than at the fundamental; i.e. the energy difference to the ground state does not correspond to the fundamental frequency. The energy at the fundamental is limited through the nonlinear process of harmonic generation and absorption and multiple photon absorption to an absolute limiting level beyond which the limiter output will not rise regardless of the intensity of the input energy.

DESCRIPTION OF THE PREFERRED EMBODIMENT

Figure 1:
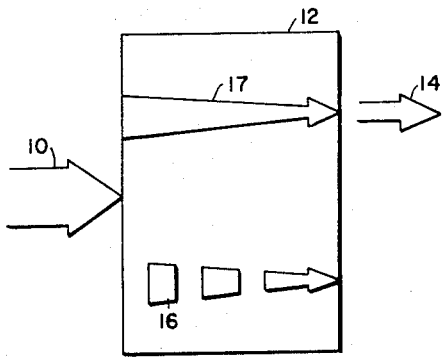
FIG. 1 is a schematic representation of an optical limiter element according to the present invention.

Turning now to FIG. 1 there is illustrated in schematic form the fundamental principle upon which the present invention is based. It has been discovered by the Applicants that when coherent radiant energy 10 is incident on some materials 12 which will be more fully described hereinbelow, the optical absorption of the material 12 tends to increase as a nonlinear function of the intensity of the input radiation although the material is transparent at the fundamental frequency of the input energy. The resulting effect is that the output energy 14 at the fundamental frequency which exits the material 12 is limited 15 to some maximum value which is dependent upon the material used. This phenomenon has been found to be useful in the fabrication of apparatus for the detection, limiting and modulation of coherent radiant energy and to be a significant advance in the state of the art. Harmonic absorption, whereby second as well as higher order harmonic energy 16 is generated and absorbed at the generation site, and multiple photon absorption, were energy 17 at the fundamental frequency is absorbed directly, two or more photons at a time, have been identified as being the significant mechanisms in the nonlinear absorption of coherent radiant energy.

In second harmonic absorption the limiting material 12 may be considered as a frequency converter which transforms part of the input energy 10 at its fundamental frequency into energy 16 at the second harmonic frequency. Although, for the sake of clarity only second harmonic generation and absorption is herein described, it is to be understood that higher order harmonic generation and absorption have also been observed. It is herein to be emphasized that the limiting material 12 is transparent at the fundamental frequency, is a strong absorber at the second harmonic frequency, and produces the frequency conversion as a nonlinear function of the intensity of the input energy. The type of nonlinearity, as derived from quantum mechanical considerations, is such as to limit the intensity level of the output energy 14 at the fundamental frequency to an asymptotic value herein termed the limiting level. As the second harmonic energy is generated, it is locally absorbed. Since the generation of the second harmonic 16 must obviously precede its absorption, it develops point by point as the laser beam traverses the limiter material. Thus the absorption of the second harmonic with its consequent thermal effects is more evenly distributed throughout the limiter material than when linear absorption is used. This dissipation of heat through the limiter material minimizes local heating and serves to increase the capacity to handle large thermal loads.

The strong local absorption of second harmonic energy eliminates the requirement for phase matching which exists with the multistage second harmonic generation limiters. The absorption coherence length is inversely proportional to the difference between the indices of refraction of the second harmonic generator and absorber materials. Since second harmonic generation and absorption in the present invention occur in a single limiter material and the second harmonic energy is fully absorbed within a very short distance which is inversely proportional to the absorption coefficient at the second harmonic frequency, the requirement for phase matching is eliminated. This further permits the use of polycrystalline materials providing the crystallite size is in excess of the absorption length. Because the absorption is controlled by the nonlinear coefficient of the limiter material more strongly than by the linear absorption constant, the effective overall absorption depends upon the input energy level and the position in the material and is strongly nonlinear. The significant result is that a nonlinear material with absorption at the second harmonic will limit transmission of coherent energy at the fundamental frequency to a level below a predetermined maximum value. The limiting level is determined by several basic properties of the limiter material and can be made to fall within desired intensity ranges by increasing the thickness of the material, increasing the absorption coefficient by doping the material with a strong second harmonic absorber or increasing the nonlinear coupling which is a linear function of the second harmonic absorption coefficient.

The second significant nonlinear absorption mechanism has been found by the applicants to be multiple photon absorption. Although two photon absorption is described herein it is to be understood that direct simultaneous absorption of three or more photons also may occur and in fact has been observed. In materials whose band gap exceeds the single photon energy of a laser; i.e. where permitted energy transitions do not correspond to the energy of a single photon, no limiting effects would normally be expected. At high laser intensities, however, there is a quadratically increasing probability that two photons will be simultaneously absorbed. This two-photon absorption has the net effect of raising an electron in the material to a higher energy state even through the transition could not occur for a single incident photon. The density of electrons elevated by two-photon absorption increases quadratically with local intensity and thus provides nonlinear limiting of coherent radiant energy to a predetermined maximum value.

Materials which are amenable for use with the present invention are characterized by having energy states other than at the fundamental laser frequency such that the absorption of coherent radiant energy into these energy states is nonlinear. This description is equally applicable to both second harmonic absorption and two-photon absorption. For a thorough description of the manner in which these materials act as nonlinear absorbers one must resort to detailed quantum theory. Basically, however, the electrons in the atomic structure of the material may only exist in a limited number of energy states, and may be elevated from a lower to a higher state by the absorption of energy. Since the permitted energy states are limited in number the quanta of energy which may be absorbed are limited to discrete values. In materials useful in the practice of the present invention the permitted energy states and thus quanta of energy which may be absorbed correspond to integral multiples of the single photon energy at the fundamental frequency. In the present invention the most significant effect is observed when the electron transition is through an energy difference corresponding to twice the single photon energy. Two photons at the fundamental frequency or a single photon at twice the fundamental frequency may be absorbed; in either case the quantum of energy matches the permitted electron energy transition. In general, materials which are acentric; i.e. lack a center of inversion, will exhibit second harmonic generation and absorption and thus be useful in the practice of the present invention. It is to be understood than any material capable of second harmonic generation may also support the two photon absorption process, however, it should be noted that the reverse is not necessarily true. In a material which will support both nonlinear absorption mechanisms it is extremely difficult to unambiguously identify which mechanism is predominant. The group IIB–VIA compounds such as single or polycrystalline zinc selenide, zinc oxide, cadmium sulfide and cadmium sulfide selenide have been found to be useful in the practice of the present invention. Optical limiting of a coherent radiant energy beam from a ruby laser has been achieved with each of these compounds in actual laboratory experimentation. A Q-switched ruby laser beam was passed through a first beam splitter, a limiter material sample and a second beam splitter. The portion of the laser energy which was reflected by each of the identical beam splitters was monitored by first and second photo diodes. The output of the first photodiode, measured in volts, was proportional to the unattenuated intensity of the beam incident on the sample material. The output of the second photodiode was indicative of the intensity of the beam after its passage through the sample material. The photodiode outputs were coupled to a dual beam oscilloscope to provide simultaneous measurements of the incident and transmitted beam intensities and the laser output was varied up to its maximum intensity of approximately 30 megawatts per square centimeter. After absolute intensity calibration of the laser it was established that intensity of the beam after passage through the limiter material was limited to a maximum level which was dependent upon the composition and thickness of the material tested. For example, a 10-millimeter thickness of cadmium sulfide provided a limiting level of about 2.4 megawatts per square centimeter for input intensities in excess of 13.0 megawatts per square centimeter. A 16-millimeter thickness resulted in a limiting level of about 0.8 megawatts per square centimeter for the same input intensity. A 1.0 centimeter thickness of cadmium sulfide selenide ($CdS_{0.5}Se_{0.5}$) provides a limiting level of 0.6 to 0.8 megawatts per square centimeters; a reduction by a factor of from 38 to 50 from the input radiation intensity. It was further noted that there was no observable damage to the test samples over the range of input intensities used in the experiments.

Figure 2:
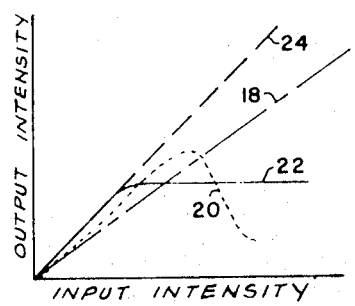
FIG. 2 is a graph illustrating the transfer function of the present invention as compared to the prior art.

FIG. 2 presents a graphic illustration of the limiting action provided by the present invention in comparison to the prior art techniques. Output intensity is plotted as a function of the input intensity for linear absorbers 18, photochromic absorbers 20 and the present invention 22. The line 24 depicts the unlimited input intensity.

Figure 3:
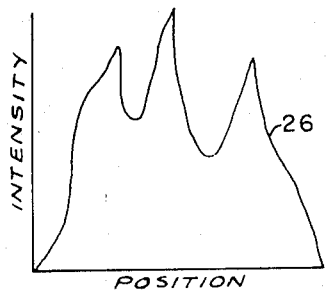
FIG. 3 is a graph of the intensity of a typical laser beam as a function of the spatial position within the beam.
Figure 3A:
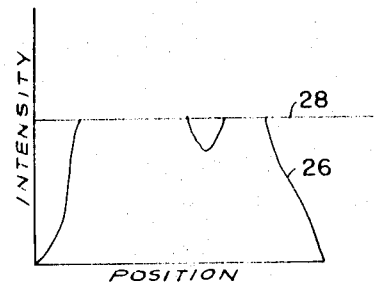
FIG. 3A is a graph of the laser beam shown in FIG. 3 after limiting by the present invention.

FIG. 3 is a graph of the intensity of a typical laser beam as a function of the spatial position within the beam, and illustrating that laser beams tend to have intensity spikes which are considerably in excess of a nominal or average value. By employing a limiter of the type described hereinabove the laser output may be limited to some maximum value as shown in the relatively smoothed output illustrated in FIG. 3A.

Figure 4:
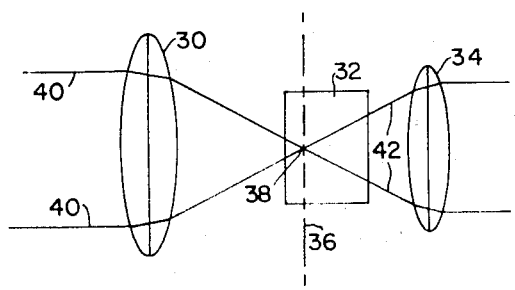
FIG. 4 is a schematic representation of a focused beam embodiment of the present invention.

In FIG. 4 there is illustrated a focused beam optical limiter embodiment of the present invention comprising a focusing lens 30, an optical limiter element 32, and a recollimating lens 34. One of the striking properties of spatially coherent energy is the possibility of increasing intensity by many orders of magnitude by focusing. In particular, the intensity increase is the ratio of the input aperture area, or area of the focusing lens 30, to the minimum focal spot area or blur circle of the lens 30 in the focal plane 36 thereof. An optical limiter material 32 disposed at the focus 38 of the lens 30 limits the intensity of the incident energy shown schematically as rays 40. The diverging energy rays 42 emerging from the limiter material are recollimated by the lens 34 resulting in effective optical limiting which is enhanced by a factor equivalent to the square of the ratio between the blur circle diameter and input aperture diameter. Since this ratio may easily be made as small as $10^{-7E-4}$ an enhancement of the limiting effect on the order of $10^{-7E-8}$ may be achieved. The foregoing discussion presumes the energy 40 to be collimated; i.e. the incident light rays are parallel, however, this condition is not required for the effective operation of the present invention, although more complex calculations are necessary to account for the effects of beam divergence, aperture geometry and beam spread.

A focused beam optical limiter may be fabricated as an independent element having its own lenses and other optical elements or a limiter could be disposed in the focal plane of a lens of an existing optical system.

Figure 5:
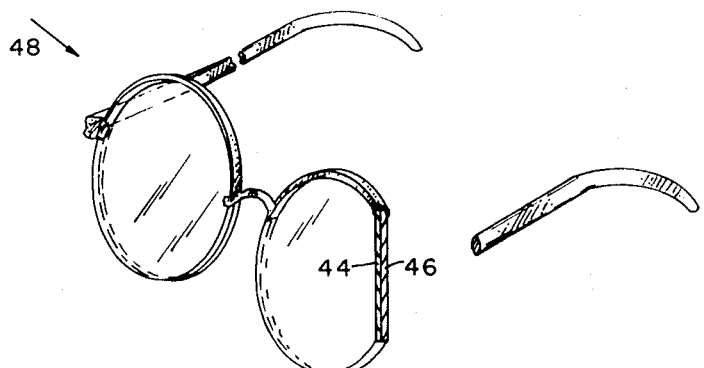
FIG. 5 is a cutaway perspective view of protective glasses fabricated according to the present invention.

As illustrated in FIG. 5, the present invention may be combined with a linear filter in a cascaded structure making the fabrication of protective goggles 48 feasible. A practical combination of this type has been found by the applicants to be a nonlinear element 44 characterized by a predetermined limiting value followed by a linear filter 46 having a preselected optical density. The linear absorber 46 serves to complement the nonlinear element 44 by absorbing relatively strongly at low intensity light levels (i.e. weak laser light or incoherent light). At higher laser levels the nonlinear element 44 begins to absorb more strongly. Thus lenses may be fabricated which have a wider dynamic range than either material 44 or 46 would have if used along. The feature of primary significance, however, is that lenses so formed permit the wearer's vision to be relatively unimpaired while providing maximum protection from high intensity coherent radiant energy. As an illustrative example of lenses which may practically be fabricated to provide protection from ruby laser energy, the nonlinear material 46 may be cadmium sulfide which is pale to medium yellow in color and as clear as window glass. The linear filter 44 may be of the neutral density type such as used in ordinary sunglasses or if more selectivity is desired, a special laser filter glass such as Schott glass number BG 18 manufactured by the Jena Glass Company, may be used. When additional limiting is desired, additional layers of nonlinear elements having successively lower limiting levels are laminated together and then to a linear absorber in the above-described manner.

Figure 6:
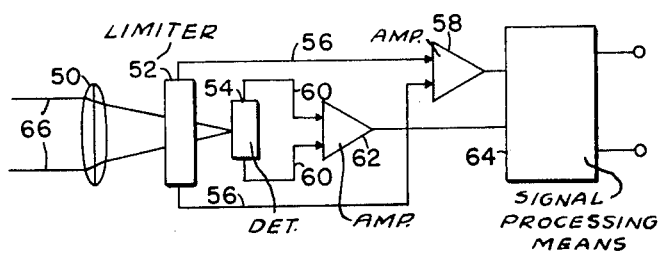
FIG. 6 is a schematic representation of an optical limiter/detector embodiment of the present invention.

Many of the materials which are amenable for use as optical limiters have also been used as photoconductors in their linear range. Since energy absorbed nonlinearly must, by the first law of thermodynamics (or conservation of energy), go somewhere, some of it creates photoconductive carriers within the limiter material. Thus as a result of the nonlinear photoconductive effects described above it is possible to provide a combined radiant energy detector/limiter as illustrated in FIG. 6. Such a system comprises a focusing lens 50, a limiter element 52, a conventional photodetector 54, limiter output leads 56 coupling the limiter element 52 and a first amplifier 58, detector output leads 60 coupling the detector 54 and a second amplifier 62. The amplifiers 58 and 62 are coupled to a suitable signal-processing means 64 the output of which is indicative of the incidence of coherent radiation 66 on the limiter element 52 and the conventional output of the detector 54. The conventional detector 54 responds to energy at intensity levels to which the limiter element is transparent. At very high intensities of input radiation 66 where the conventional detector 54 would tend to saturate or suffer physical damage, the optical limiter element 52 begins to respond as a detector in the above described manner. At these high intensity levels, however, the limiter element 52 transmission decreases, thus protecting the conventional detector 54 from damage by limiting the light intensity incident thereon to a predetermined maximum level.

Figure 7:
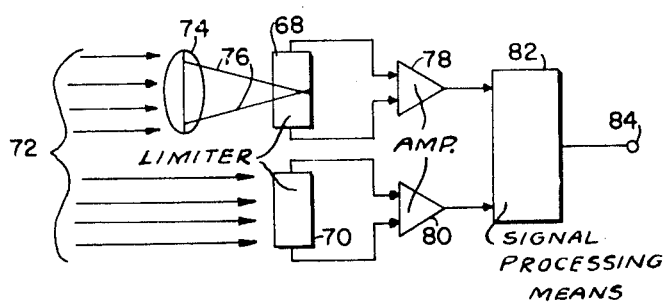
FIG. 7 is a schematic representation of an optical discriminator according to the present invention.

It has further become feasible through the practice of the present invention to provide a system whereby coherent radiant energy may be distinguished from incoherent background radiation. An embodiment of the present invention providing such a capacity is schematically illustrated in FIG. 7 and comprises a balanced pair of limiter/detector elements 68 and 70 which match in output when exposed to identical radiation shown generally as rays 72. A focusing lens 74 is combined with one of the elements 68 thus focusing high-intensity radiation 76 thereon. The outputs of the individual elements are applied to first and second amplifiers 78 and 80 respectively and the amplifier outputs are compared in a signal-processing means 82 such as a difference network or a divider circuit. The difference between the outputs of the elements 68 and 70 is thus a measure of the nonlinear intensity redistribution effect and any incoherent background radiation is cancelled out in the output 84 of the signal processor 82. Any difference beyond a preselected threshold value may be taken as a strong indication that coherent energy is being received.

Figure 8:
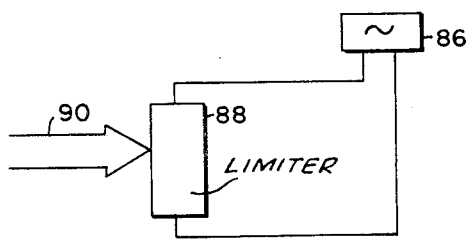
FIG. 8 is a schematic representation of an optical modulator embodiment of the present invention.

Still a further embodiment of the present invention is illustrated in FIG. 8. It has been found by the applicants that the application of an electric field to the limiter element results in a shift in the nonlinear absorption characteristic of the element. Thus by applying a potential difference from a power supply 86 across the limiter element 88 the limiting level thereof may be modulated. Thus when input energy 90 is incident on the limiter element 88 the output intensity may be modulated in accordance with the applied voltage.

It will thus be seen that the objects set forth above, among those made apparent from the preceding description are efficiently attained and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention, therein described, and all statements of the scope of the invention, which, as a matter of language, might be said to fall therebetween.

Having described what is new and novel and deemed to secure by Letters Patent, what is claimed is:

1. A method of limiting the intensity of a beam of coherent radiant energy comprising the step of interposing in said beam an element formed of an acentric crystalline compound selected from the oxides, sulfides, selenides and tellurides of the metallic group IIB elements of the periodic table and having energy states into which radiant energy incident upon said element is absorbed at least in part as a nonlinear function of the intensity of said radiant energy whereby the intensity of radiant energy transmitted by said material is limited to a preselected maximum level.

2. The method as recited in claim 1 wherein said compound is selected from the group of IIB-VIA compounds consisting of
zinc selenide,
zinc oxide,
cadmium sulfide, and
cadmium sulfide selenide.

3. The method as recited in claim 1 further including the step of increasing the radiant intensity of said radiant energy beam incident on said element.

4. The method as recited in claim 1 further including the step of interposing a linear absorption element in the path of said energy transmitted by said material to thereby attenuate said transmitted radiant energy.

5. The method as recited in claim 1 further including the step of detecting said radiant energy absorbed by said element.

6. The method as recited in claim 4 and still further including the step of mounting said nonlinear element and said linear absorption element in frames adapted to be worn over the eye to thereby provide a method operative to prevent eye damage by high-intensity coherent radiant energy.

7. The method as recited in claim 1 further including the step of biasing said element to thereby alter the intensity dependence of the absorption quality thereof.

8. A nonlinear limiter of coherent radiant energy comprising means for increasing the radiant intensity of said radiant energy, and an element formed of an acentric crystalline compound selected from the oxides, sulfides, selenides and tellurides of the metallic group IIB elements of the periodic table and having energy states into which radiant energy incident on said element is absorbed at least in part as a nonlinear function of the intensity of said radiant energy, said element being disposed in the path of said radiant energy of increased radiant intensity, whereby the intensity of said radiant energy transmitted by said element is limited to a preselected limiting level through nonlinear absorption.

9. Apparatus as recited in claim 8 wherein said radiant intensity increasing means is a focusing lens.

10. Apparatus as recited in claim 9 wherein said element is disposed such as to encompass the focal spot of said lens.

11. Apparatus as recited in claim 8 further including means for collimating radiant energy transmitted by said element.

12. Apparatus as recited in claim 8 wherein said compound is selected from the group of IIB-VIA compounds consisting of
zinc selenide,
zinc oxide,
cadmium sulfide, and
cadmium sulfide selenide.

13. A coherent radiant energy modulator comprising an element formed of an acentric crystalline compound selected from the oxides, sulfides, selenides and tellurides of the metallic group IIB elements of the periodic table and having energy states into which energy incident upon said element is absorbed at least in part as a nonlinear function of the intensity of said radiant energy, and means for biasing said element to thereby alter the intensity dependence of the absorption quality thereof.

14. Apparatus as recited in claim 13 wherein said compound is selected from the group of IIB-VIA compounds consisting of
zinc selenide,
zinc oxide,
cadmium sulfide, and
cadmium sulfide selenide.

15. Apparatus as recited in claim 13 wherein said biasing means comprises a modulatable source of electric potential coupled across said element.

* * * * *

PO-1050
(5/69)

UNITED STATES PATENT OFFICE
CERTIFICATE OF CORRECTION

Patent No. 3,620,597          Dated November 16, 1971

Inventor(s) Jacob Schwartz et al

It is certified that error appears in the above-identified patent and that said Letters Patent are hereby corrected as shown below:

Column 3, line 16          the number "15" should be deleted.

Column 5, line 49          the number "$10^{7E'4}$" should read --$10^{-4}$--.

Column 5, line 50          the number "$10^{7E'8}$" should read --$10^{-8}$--.

Signed and sealed this 9th day of May 1972.

(SEAL)
Attest:

EDWARD M. FLETCHER, JR.          ROBERT GOTTSCHALK
Attesting Officer          Commissioner of Patents